(12) United States Patent  
Chovin et al.

(10) Patent No.: US 6,968,239 B1  
(45) Date of Patent: Nov. 22, 2005

(54) UNIVERSAL TOOL FOR SUPERVISING AND CONTROLLING AUTOMATONS

(75) Inventors: André Chovin, Allex (FR); Alain Chatenay, Marly le Roi (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/719,537

(22) PCT Filed: Apr. 7, 2000

(86) PCT No.: PCT/FR00/00899

§ 371 (c)(1),  
(2), (4) Date: Dec. 18, 2000

(87) PCT Pub. No.: WO00/63752

PCT Pub. Date: Oct. 26, 2000

(30) Foreign Application Priority Data

Apr. 16, 1999 (FR) .................................. 99 04821

(51) Int. Cl.[7] .............................................. G05B 19/18
(52) U.S. Cl. ..................... 700/3; 719/208; 710/110
(58) Field of Search ..................... 700/3, 18–19, 700/20; 709/208, 211; 710/110

(56) References Cited

U.S. PATENT DOCUMENTS

| 5,038,318 | A | * | 8/1991 | Roseman ...................... 712/30 |
| 5,428,526 | A | | 6/1995 | Flood et al. |
| 5,428,555 | A | * | 6/1995 | Starkey et al. .............. 700/275 |
| 5,469,150 | A | | 11/1995 | Sitte |
| 5,771,174 | A | * | 6/1998 | Spinner et al. ............. 700/129 |
| 5,991,528 | A | * | 11/1999 | Taylor et al. .................. 703/6 |
| 6,112,132 | A | * | 8/2000 | Grube ........................ 700/167 |
| 6,609,070 | B1 | * | 8/2003 | Lueck ......................... 702/50 |

FOREIGN PATENT DOCUMENTS

| EP | 0 621 522 | 10/1994 |
| FR | 2 752 315 | 2/1998 |

* cited by examiner

*Primary Examiner*—Zoila Cabrera  
(74) *Attorney, Agent, or Firm*—Oblon, Spivak, McClelland, Maier & Neustadt, P.C.

(57) ABSTRACT

A tool which is entrusted with supervising and driving automatons that are "smart"; namely the tool can communicate with a microcomputer. This tool has a microcomputer, with a spreadsheet program connected through a driver, an operating system of the microcomputer, and a connection line to the automatons. The driver emulates the proprietary language for controlling and supervising the automatons.

16 Claims, 1 Drawing Sheet

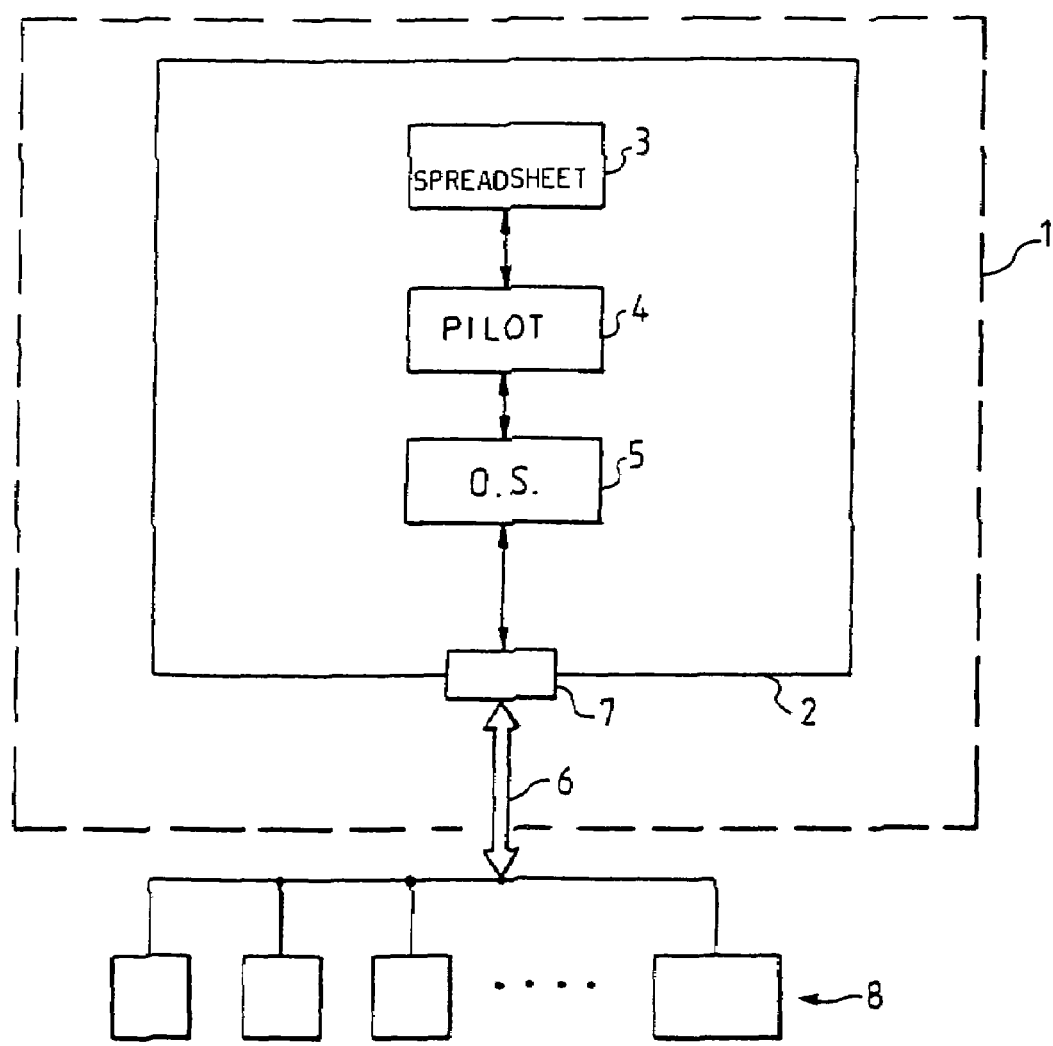

UNIVERSAL TOOL FOR SUPERVISING AND CONTROLLING AUTOMATONS

BACKGROUND OF THE INVENTION

1. Field of the Invention

The present invention relates to a universal tool for supervising and driving automatons.

2. Discussion of the Background

The automatons in question here may be small micro-automatons (a few centimeters in size) as well as bigger automatons and these devices can not only drive various machines (motors, activators, robots, etc.) but also supervise sensors.

Known automaton control devices may be general-purpose supervisors that are complicated, costly and difficult to carry from one type of platform to another and/or difficult to customize, or else they may be dialog and parameterizing interfaces, dedicated to a specific product with limited, fixed and closed-ended functions, which are also difficult to carry and customize.

SUMMARY OF THE INVENTION

An object of the present invention is a tool for the supervision and driving of automatons that is provided with many powerful functions and is simple, economical and capable of being carried on different platforms, especially on PCs.

The tool according to the invention is a universal tool for supervising and driving automatons by means of a microcomputer connected to these automatons which are provided with their data-exchange functions and it comprises an automaton interface driver exchanging commands and/or data with a spreadsheet program executed on the microcomputer, this driver furthermore exchanging data and/or commands with at least one automaton through the communications means of the microcomputer and its operating system.

BRIEF DESCRIPTION OF THE FIGURE

The present invention will be understood more clearly from the following detailed description of an embodiment given as a non-restrictive example with reference to the appended drawing, wherein the single FIGURE is a block diagram of a tool according to the invention.

DESCRIPTION OF THE PREFERRED EMBODIMENTS

The tool 1 of the single FIGURE in the drawing comprises a microcomputer 2, for example of the PC type. One of the programs with which this microcomputer is equipped is a spreadsheet program 3, for example the EXCEL spreadsheet program. This spreadsheet program 3 sends commands and/or data elements to an automaton interface driver 4 and receives data therefrom. This driver 4 communicates with the operating system 5 of the microcomputer. The system 5 has access to at least one communications line 6 connected to an input-output port 7 of the microcomputer. This communications line 6 may be a serial or parallel type of line, or it may be a bus. The line 6 is connected to a set 8 of automatons.

The term "automaton" herein designates "smart" automated components, namely components provided at least with means by which they can communicate with the microcomputer 2 through the communications line 6 in at least one direction, to receive commands and/or data and/or to transmit data (such as measured physical variables in the case of sensors, or positions in the case of mobile components, or states in the case of selector switches for example). Advantageously, these components have a memory in which data can be stored on their characteristics or their operation. Examples of such components are activators, sensors, servo valves, relays, programmable automatons or remote input/output units, namely units distinct from the microcomputer and automation components connected to the line 6 and comprising at least one analog-digital converter and/or one digital-analog converter as well as a multiplexer and/or a demultiplexer or again program automatons with the same functions as the remote inputs/output units with, moreover, the capacity to perform automation sequences on their own.

The driver 4 manages and optimizes the dialog between the microcomputer 2 and the automatons 8 through the operating system 5. It emulates the proprietary language for the control and/or dialog and/or parameterizing and/or program downloading functions of the automatons 8. It organizes the commands coming from the spreadsheet program in the form of messages in order to send them to the automatons 8 and it extracts data from the messages that reach the automatons in order to transmit them in appropriate form to the program. These messages naturally must be compatible with the transmission characteristics on the line 6.

The making of the driver 4 will be evident to those skilled in the art with knowledge of this proprietary language and the programming of the microcomputer.

The various functions of the tool of the invention are the following:

It changes the state of any automaton of the unit 8, initializes, starts, stops, parameterizes, tests any automaton, downloads a program into any automaton, etc.).

As the case may be, it can modify one or more specific parameters of at least one of the automatons 8 (for example a parameter such as rotation speed in the case of a motor, etc.).

It enables the iterative reading, for a defined period (the sampling period compatible with the characteristics of the operating system 5) of a set of data arranged in an order (generally the rising order) in a column or in a line of the program 3 at the rate of one sample per cell.

It can be used to obtain a variation in time of a graphic attribute (size, color, position, plane, etc.) of a drawing, an image, a film or any object that can be drawn or imported into the spreadsheet program, as a function of the digital value or the state of a data element read in the memories of an automaton.

It can be used to associate an action with a graphic object or a dialog interface of the spreadsheet program by modifying a data element implanted in the memory of the automaton.

Thus, the user can have available a set of examples of actuation and dialogs that can be processed with the spreadsheet program in a system of development such as Visual Basic, Visual C, etc. He can then build a customized mini-supervisor while using another well-known and widely used tool such as the spreadsheet program. Furthermore, if the program is dynamically associated with at least one other program, for example if it forms part of an integrated program such as OFFICE, the user can use this other program to process, namely store, present, analyze and classify all data or combinations of data coming from the automatons.

Naturally, the driver 4 is designed in such a way that it does not disturb the dynamic links between the spreadsheet program and the other programs associated with it.

What is claimed is:

1. A system comprising:
   at least one automaton, said at least one automaton provided with a data-exchange function, said at least one automaton connected to at least one of a sensor or an actuator;
   a communication line; and
   a microcomputer connected to communicate with said at least one automaton through the communication line connected to a microcomputer input, said microcomputer comprising an automaton interface driver, an operating system, and a spreadsheet program, wherein said automaton interface driver cooperates with the operating system to provide commands from said spreadsheet program and to receive data from said at least one automaton through said communication line and microcomputer input, and the automaton interface driver emulates the proprietary language of said at least one automaton and wherein said spreadsheet program sends commands to said automaton interface driver.

2. The system recited in claim 1, wherein said at least one automaton comprises remote inputs/outputs, and said at least one of a sensor or an actuator connected to said at least one automaton is configured to communicate data to the communication line and is configured to receive at least one of a microcomputer command or a data from the microcomputer via the communication line.

3. The system recited in claim 1, wherein said automaton interface driver emulates the proprietary language for at least one of a control function, a dialog function, a parameterizing function or a program download function of said at least one automaton.

4. The system recited in claim 1, wherein said at least one automaton further comprises memory operatively arranged to store a characteristic of operation of said at least one automaton.

5. The system recited in claim 1, wherein said spreadsheet program is dynamically associated with at least one other program, said system further comprising means for processing said data received from said at least one automaton by said at least one other program.

6. The system recited in claim 1, wherein said automaton interface driver organizes spreadsheet program commands into messages for transmission to said at least one automaton.

7. The system recited in claim 1, wherein said automaton interface driver is configured to manage and optimize a dialog between the microcomputer and the at least one automaton.

8. The system as recited in claim 1, wherein the automaton interface driver is a software running on said microcomputer.

9. The system recited in claim 1, wherein said automaton interface driver emulates the proprietary language for a control function of said at least one automaton.

10. The system recited in claim 1, wherein said automaton interface driver emulates the proprietary language for a dialog function of said at least one automaton.

11. The system recited in claim 1, wherein said automaton interface driver emulates the proprietary language for a parameterizing function of said at least one automaton.

12. The system recited in claim 1, wherein said automaton interface driver emulates the proprietary language for a program download function of said at least one automaton.

13. The system recited in claim 1, wherein said at least one automaton is connected to at least one sensor.

14. The system recited in claim 1, wherein said at least one automaton is connected to at least one actuator.

15. The system recited in claim 1, wherein said at least one of a sensor or an actuator is configured to receive a microcomputer command via the communication line.

16. The system recited in claim 1, wherein said at least one of a sensor or an actuator is configured to receive data from the microcomputer via the communication line.

* * * * *